S. EDWARDS.
LUNCH PAIL.
APPLICATION FILED NOV. 18, 1909.
971,735.
Patented Oct. 4, 1910.
2 SHEETS—SHEET 1.
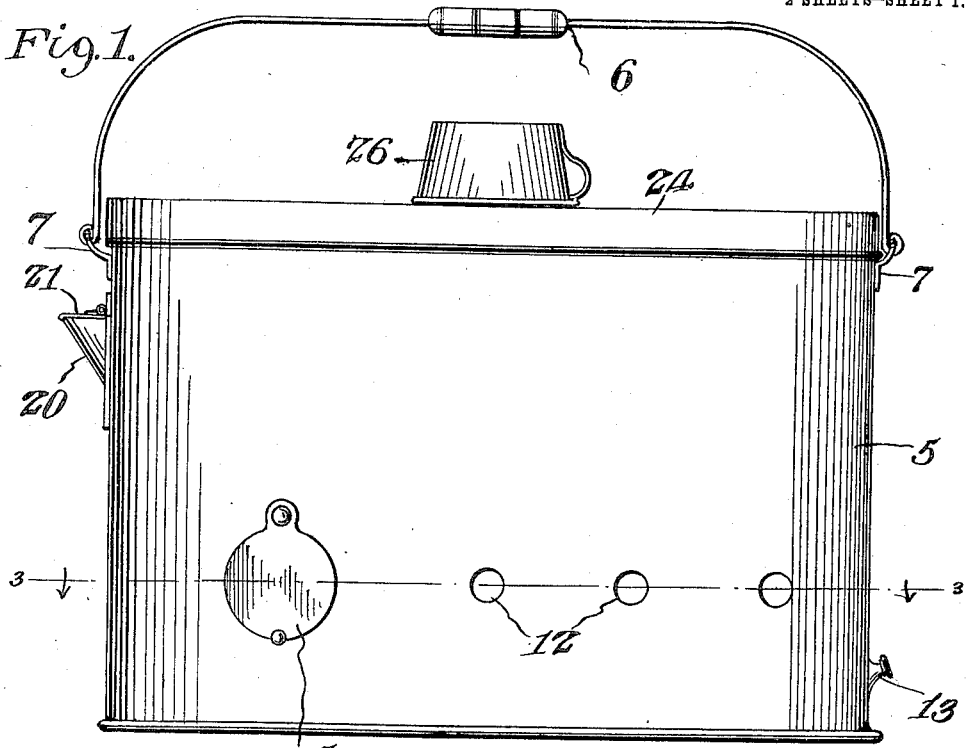
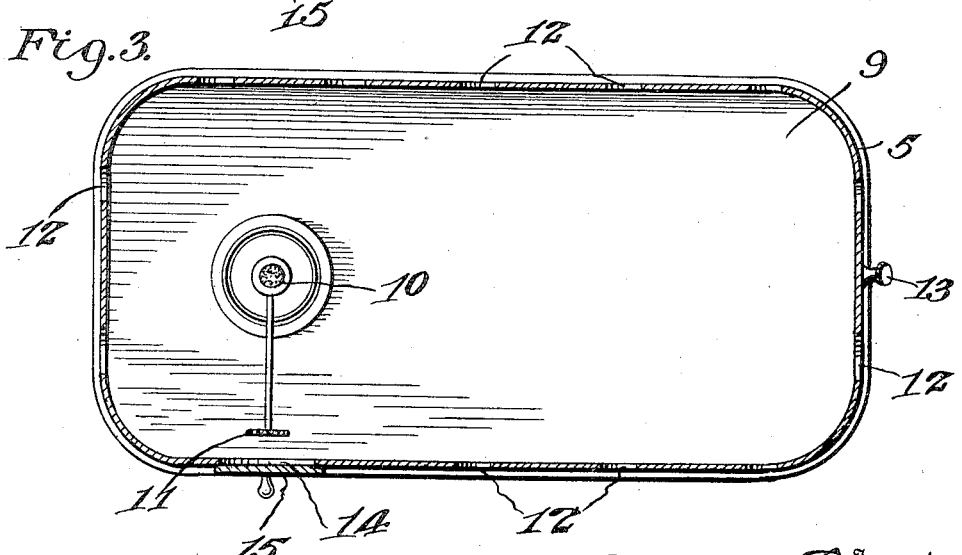
Witnesses:
Joe. P. Wahler.
E. M. Ricketts.
Inventor
Simpson Edwards
By Watson E. Coleman
Attorney S. EDWARDS.
LUNCH PAIL.
APPLICATION FILED NOV. 18, 1909.
971,735.
Patented Oct. 4, 1910.
2 SHEETS—SHEET 2.
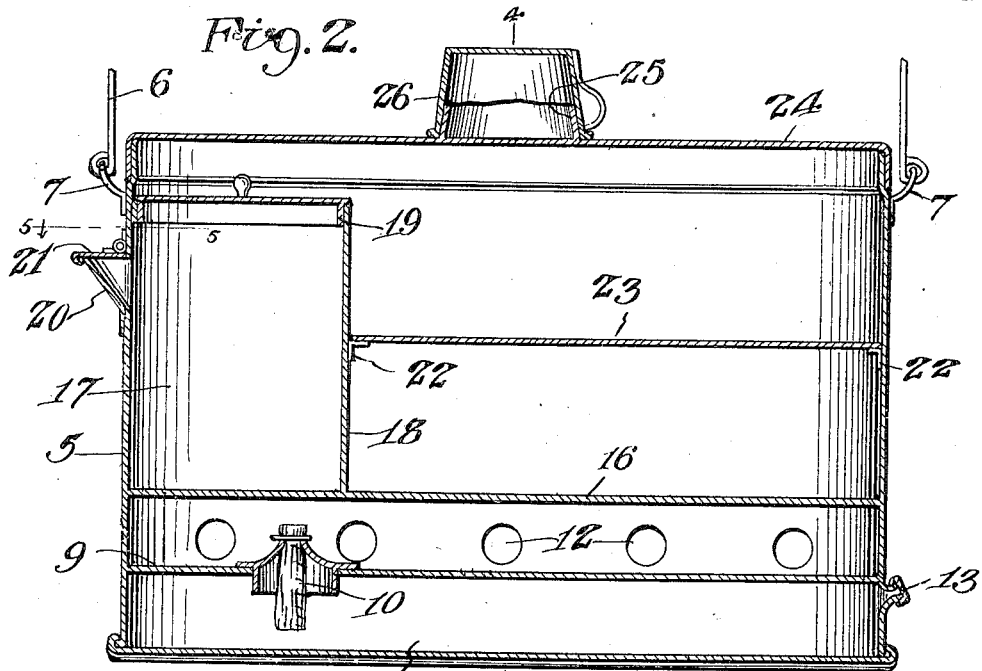
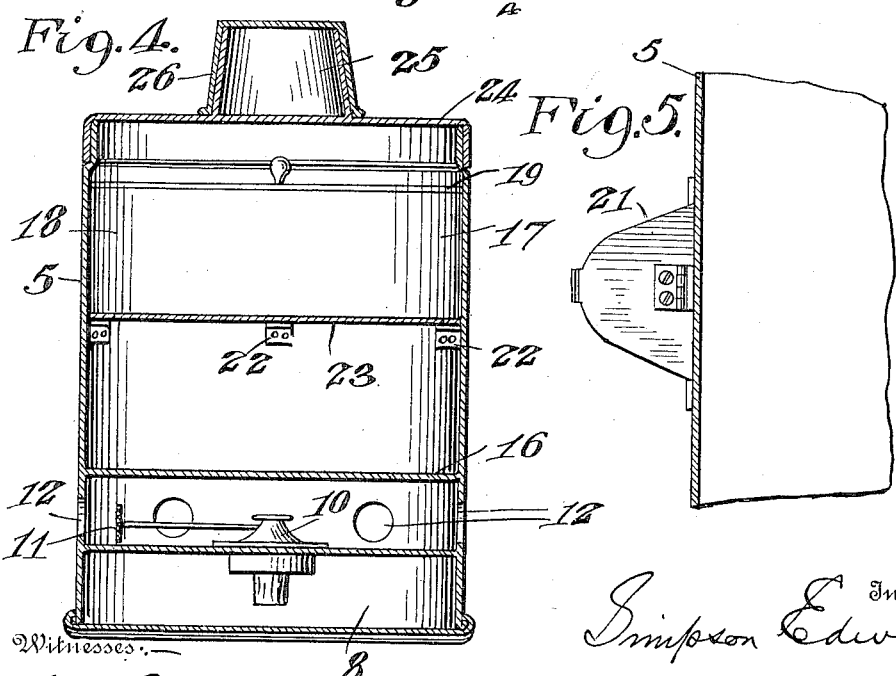

UNITED STATES PATENT OFFICE.

SIMPSON EDWARDS, OF BLOOMINGTON, ILLINOIS.

LUNCH-PAIL.

971,735. Specification of Letters Patent. Patented Oct. 4, 1910.

Application filed November 18, 1909. Serial No. 528,756.

*To all whom it may concern:*

Be it known that I, SIMPSON EDWARDS, a citizen of the United States, residing at Bloomington, in the county of McLean and State of Illinois, have invented certain new and useful Improvements in Lunch-Pails, of which the following is a specification, reference being had to the accompanying drawings.

This invention relates to certain new and useful improvements in lunch pails and has for its object to provide a device of this character which is so constructed that tea or coffee may be carried therein and kept in a heated condition.

Another object is to provide a lunch pail which is simple, may be easily cleaned, and is adapted to contain a large amount of food.

With these and other objects in view, the invention consists of the novel construction, combination and arrangement of parts hereinafter fully described and claimed, and illustrated in the accompanying drawings, in which—

Figure 1 is a side elevation of a lunch pail constructed in accordance with the present invention; Fig. 2 is a vertical section thereof; Fig. 3 is a section taken on the line 3—3 of Fig. 1; Fig. 4 is a section on the line 4—4 of Fig. 2; Fig. 5 is a detail section taken on line 5—5 of Fig. 2.

Referring to the drawings 5 indicates the body or casing of the pail which is preferably constructed of sheet metal and is provided with the handle 6 pivoted in the eye plates 7 secured to the opposite ends thereof. The body is provided in its bottom with an oil chamber 8 the top of which is formed by the plate 9 suitably secured therein. A burner 10 is fixed in this plate and the wick may be readily adjusted by manipulating the raiser 11. The casing 5 is provided above the plate 9 with a plurality of openings 12 through which a plentiful supply of oxygen is admitted to the flame of the burner. The oil chamber is fed through the spout 13 in one end of the pail. An opening 14 is also provided opposite to the burner whereby the same may be conveniently lighted. This opening is adapted to be closed by means of the plate 15 pivoted to one side of the casing 5 within the same.

Above the burner a second plate 16 is arranged parallel to the plate 9 and forms the bottom of the fluid and provision chambers. The fluid chamber 17 is formed by securing a transverse plate 18 in one end of the pail. This plate extends from the plate 16 to a point adjacent to the top of the pail. A cover 19 is provided therefor and a spout 20 is formed in the end of the pail casing. This spout is closed by the hinged plate 21 whereby all dirt and dust will be excluded. Upon the transverse plate 18 midway between its ends a flange 22 is secured and a similar flange is secured to the interior of the end of the pail. A removable partition 23 is supported on these flanges and divides the provision chamber into two separate compartments which may contain different articles of food that it may be found desirable should be separated from each other. The pail is closed by means of a cover 24 which is centrally formed with a milk or cream container 25. This receptacle may be conveniently closed by means of the drinking cup 26 which is inverted and placed thereover.

From the foregoing it will be seen that I have provided a lunch pail of great convenience and utility whereby tea or coffee may be kept heated indefinitely. Any provisions which it is desired to heat are placed in the lower provision compartment and next to the transverse plate 18 which forms the fluid chamber. The various chambers are easily cleaned and a large quantity of food may be carried in the pail.

While I have shown and described the preferred embodiment of my invention it will be understood that various minor changes may be resorted to in the form, proportions and minor details of construction without departing from the spirit or sacrificing any of the advantages of the invention.

Having thus described the invention, what is claimed is:

In a device of the character described, the combination of a casing having an oil chamber in the bottom thereof, a burner communicating with said chamber, a plate arranged in said casing and extending the entire length thereof in parallel relation above the top of said chamber, said casing having air openings between the oil chamber and said plate, the heat generated by the burner circulating between the top of said chamber and said plate throughout the length of the casing, a transverse plate in one end of said casing forming a fluid chamber between said plate and the casing, a spout formed in the end of the casing communicating with said chamber, a flange secured to said plate, a flange secured to the opposite end of said casing, a removable division plate supported on said flanges providing upper and lower provision compartments, a cover for the upper open end of the pail having a fluid container integrally formed centrally thereof, a drinking cup adapted to be inverted and placed over said container, and a handle member pivoted to the opposite ends of said casing.

In testimony whereof I hereunto affix my signature in the presence of two witnesses.

SIMPSON EDWARDS.

Witnesses:
　EDUARD GRAVES,
　WALTER GRAVES.